(12) United States Patent
Han et al.

(10) Patent No.: US 6,489,957 B1
(45) Date of Patent: Dec. 3, 2002

(54) THREE DIMENSIONAL GEOMETRIC MODELING SYSTEM WITH MULTIPLE CONCURRENT GEOMETRIC ENGINES

(75) Inventors: Tao-Yang Han, Marietta, GA (US); Qingxiang Niu, Marietta, GA (US); Chien-Ming Huang, Marietta, GA (US)

(73) Assignee: Alventive, Inc., Santa Clara, CA (US)

( * ) Notice: Subject to any disclaimer, the term of this patent is extended or adjusted under 35 U.S.C. 154(b) by 0 days.

(21) Appl. No.: 09/421,122

(22) Filed: Oct. 19, 1999

(51) Int. Cl.[7] .............................................. G06T 17/00
(52) U.S. Cl. ....................................................... 345/420
(58) Field of Search ................................ 345/418, 419, 345/420, 421, 422

(56) References Cited

U.S. PATENT DOCUMENTS 5,861,889 A 1/1999 Wallace et al.
5,894,310 A 4/1999 Arsenault et al.

*Primary Examiner*—Cliff N. Vo
(74) *Attorney, Agent, or Firm*—Nixon & Vanderhye, P.C.

(57) ABSTRACT

A computer program product (400) and system executing/implementing the same provides a visual depiction of a part or assembly or scene (200) upon a display device. Upon execution, the program establishes for the system (1) a design flow system (404) comprising an object for each of one or more shapes, and (2) a modeling kernel (410). The modeling kernel comprises multiple concurrently available geometric engine types (432). The program enables performance of operations upon differing shapes in a same assembly, the differing shapes being generated by differing geometric engine types and the operations upon the assembly being performed by invoking the concurrently available geometric engine types in the modeling kernel. The the design flow system of the program also facilitates section of which of the multiple geometric engine types should attempt to perform an operation with respect to the one or more shapes. If a the first geometric engine type selected by the design flow system is unable to perform the requested operation successfully, a second geometric engine type is invoked for a further attempt or transfer of the operation performance. For this transfer, the modeling kernel comprises a cross-kernel communication (438) module through which plural drivers of the kernel communicate. The modeling kernel also comprises a translator (440) which, in turn, is invoked by the cross-kernel communication module in conjunction with the transfer of an operation request.

26 Claims, 10 Drawing Sheets

DESIGN FLOW SYSTEM OPERATION

*Fig. 5*
DESIGN FLOW SYSTEM OPERATION

*Fig. 6*
DRIVER OPERATION

Fig. 8

THREE DIMENSIONAL GEOMETRIC MODELING SYSTEM WITH MULTIPLE CONCURRENT GEOMETRIC ENGINES

BACKGROUND

1. Field of the Invention

The present invention pertains to computerized three dimensional geometric modeling systems, and particularly to a three dimensional geometric modeling system which employs multiple concurrent geometric engine types.

2. Related Art and Other Considerations

The computer has greatly affected essentially all forms of information management, including the geometric modeling arts. Nowadays there are numerous computer program products that allow the user to create, store, and modify geometric models and their graphical renderings of various types on a display screen, and to print or otherwise output such geometric models and their renderings. Such geometric models and their graphical renderings span the gambit from simple to complex, and can vary in subject matter, e.g., artistic, industrial, etc. Some geometric modeling computer program products are two dimensional, providing only length and width dimensions of objects. The more complex three dimensional computer program products, on the other hand, provide three dimensions—length, width, and depth/thickness.

Three dimensional geometric modeling programs can generate a scene or part which can comprise one or more constituent 3D shapes. For example, a scene featuring a simple table would comprise a shape for each leg of the table, as well as a shape for a flat table top. The geometric modeling computer program typically has an executable object used to define and generate each shape. The object for each shape can have several components, the components being a combination of executable code and data structure. For example, a boundary representation ("B-rep") component includes a data structure describing the geometry and topology data for the shape (e.g., length, width, depth, and coordinates of the part).

Most three dimensional geometric modeling programs employ a feature-based parametric modeling technique. In feature-based parametric modeling, the executable object for each shape has not only a boundary representation component, but also a history or creation component which includes a data structure reflecting how a shape has been created. That is, the history/creation component includes data which indicates an order or chronological sequence of steps employed to construct the shape. For a simple block, for example, the history/creation component may indicate that the block began as a simple two dimensional rectangle that was extruded into a third dimension. U.S. patent application Ser. No. 08/635,293, filed Apr. 19, 1996, entitled "Intelligent Shapes For Authoring Three-Dimensional Models", incorporated herein by reference, discloses shapes having various other components in addition to boundary representation and historical components such as: a visual component; a physical component; a functional component; and a behavioral component.

Parts can be formed from other parts. In geometric modeling terms, the building of more complicated shapes in hierarchical fashion from simpler shapes (known as "primitives") is known as "constructed solid geometry" ("CSG"). A geometric engine can combine the simpler shapes using various operations (e.g., Boolean operations such as "intersect", "unite", "subtract", etc.). The computer stores the overall (complex) shape as a tree, each of the "leaves" of the tree comprising a primitive shape. Typically, when the user wants to modify a feature-based shape by changing any aspect of the shape, the feature-based parametric modeling technique re-evaluates the shape, e.g., goes through the entire CGS history tree in order to revise the part in accordance with the change.

Most three dimensional modeling systems utilize a geometric engine for the purpose of performing various operations and computations for shapes. These operations and computations can take various forms, including (for example) Boolean operations, and typically involve the geometric engine modifying the boundary representation components of one or more shapes involved in the operation. Typically a three dimensional modeling system has one geometric engine for performing all the geometric computations and operations required by the three dimensional modeling system. Geometric data created by the three dimensional modeling system is, therefore, stored in a form (e.g., a file or data stream in a file) which is native to the particular geometric engine creating it.

Often geometric data which is generated at a first three dimensional modeling system must be transferred to a second three dimensional modeling system for copying and/or further developmental work. If it turns out that the second three dimensional modeling system does not have the same geometric engine type as the first three dimensional modeling system which created the geometric data, the data must first be processed by a translator. The translator can be either a stand-alone or separate piece of software unconnected to the three dimensional modeling systems, or integrated in a three dimensional modeling systems. Upon completion of the translation to a form compatible with the geometric engine type of the second three dimensional modeling system, the data can be utilized by the second three dimensional modeling system.

Utilization of the translator as described above is not always successful. In some instances, accurate and complete translations cannot be made. In addition to such fidelity problems, of course, the additional step of employing a translator complicates and slows the entire process.

A few three dimensional modeling systems are able to interchange geometric engine types, i.e., switch between geometric engine types. However, such interchange or switch capability is limited so that only one geometric engine type can be utilized at any given instance. To use another geometric engine type, a reconfiguration of the three dimensional modeling system must occur, with a second geometric engine type then being substituted so that a new three dimensional modeling system results. To replace the geometric engines of these three dimensional modeling systems by different geometric engines is a major effort, if not impossible in some situations. Replacement requires many man years of development work to switch the underlying geometric engine. Therefore, almost all three dimensional modeling systems support only one geometric engine. In such limited situations in which a three dimensional modeling system replaces its original engine type with another engine type, the original engine type is not supported any longer.

What is needed, and an object of the present invention, is a three dimensional computer aided geometric modeling system which provides concurrent utilization of multiple geometric engine types.

BRIEF SUMMARY OF THE INVENTION

A computer program product and system executing/implementing the same provides a visual depiction of a three dimensional object upon a display device. Upon execution, the program establishes for the system (1) a design flow system comprising an object for each of one or more shapes, and (2) a modeling kernel. The design flow system and modeling kernel communicate across COM interfaces. The modeling kernel comprises multiple concurrently available geometric engine types. The modeling kernel comprises multiple geometric engine-specific kernels, with each geometric engine-specific kernel comprising one of the geometric engine types and an associated driver.

Differing shapes or parts in a design or assembly can be associated with respective differing geometric engine types, and can be operated upon by the respective geometric engines in the same assembly. When performing modeling operations, the differing geometric engines types associated with the differing shapes/parts are seamless to users of the three dimensional modeling system, and are conducted from the user's vantage point as if all shapes/parts are associated with the same geometric engine.

The design flow system of the program also facilitates selection of which of the multiple geometric engine types should at least initially attempt to perform an operation with respect to the one or more shapes. When necessary in preparation for calling the selected geometric engine type, the design flow system obtains a translation of a file of a B-rep body for a shape involved in the operation, the translation making the file of the B-rep body compatible with the geometric engine type selected for the operation. If the first geometric engine type selected by the design flow system is unable to perform the requested operation successfully, the driver of the initially-designated geometric engine type invokes a second geometric engine type for a further attempt or transfer of the operation performance (the invocation being made via the driver for the second geometric engine type). For this transfer, the modeling kernel comprises a cross-kernel communication module through which plural drivers of the kernel communicate for the purpose of transferring performance of the operation. The modeling kernel comprises a translator which, in turn, is invoked by the cross-kernel communication module in conjunction with the transfer of an operation request between geometric engine-specific kernels.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
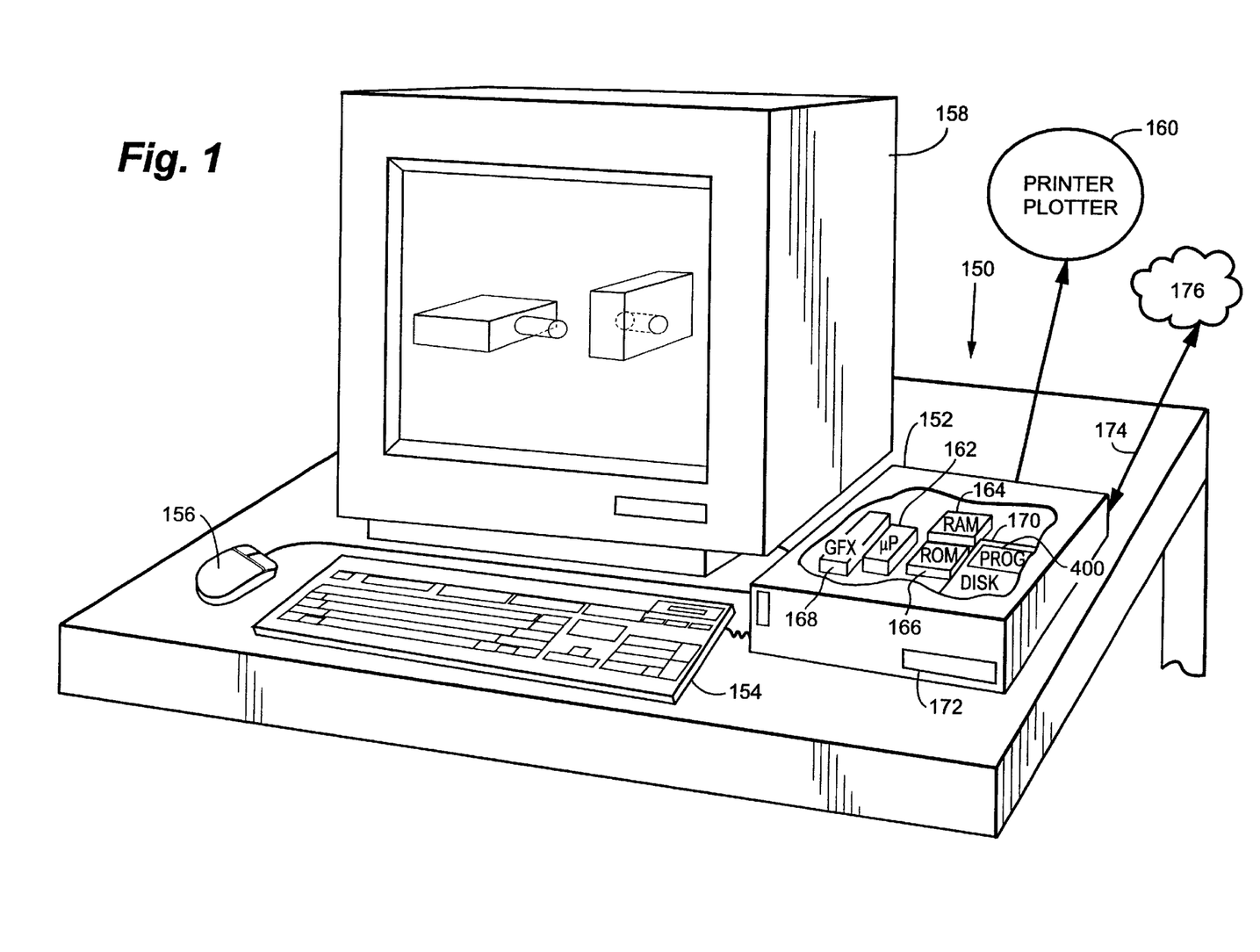
FIG. 1 is a schematic view of an example computer geometric modeling workstation according to an embodiment of the invention.

FIG. 1 shows an example computer graphics workstation 150 accordingly to an embodiment of the invention. Workstation 150 includes a general purpose computer 152, a keyboard 154, a mouse pointing device 156, a display 158, and a printer/plotter 160. Computer 152 may be, for example, a conventional microcomputer such as an IBM compatible personal computer including a microprocessor 162, random access memory 164, read only memory 166, a graphics video adapter 168, a mass storage device such as a magnetic disk 170, and an optical and/or floppy diskette drive 172. Computer 152 displays images on display 158 (and/or prints the images on printer/plotter 160) in response to user inputs via keyboard 154 and/or mouse pointing device 156. The computer 152 creates images based on steps it performs under control of a computer program product 400 stored on mass storage device 170 and/or another storage media (e.g., an optical or magnetic disk, not shown) provided via drive 172. A communications connection 174 between computer 152 and a network 176 (e.g., the Internet) may be provided to allow the user to access information from the network and/or exchange information with another computer also connected to the network.

Figure 2:
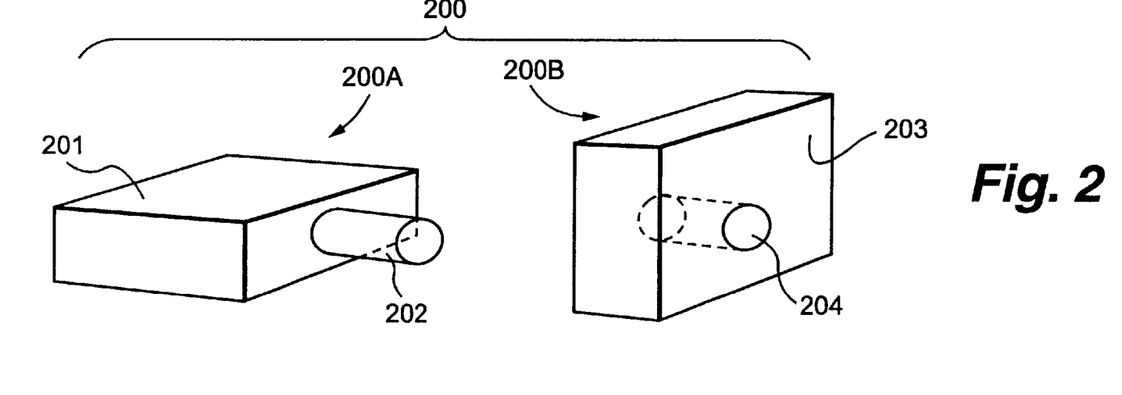
FIG. 2 is an isometric view of two parts depicted on a display screen of the workstation of FIG. 1.

An enlargement of the particular image (e.g., design or assembly) 200 displayed on display 158 in FIG. 1 is shown in FIG. 2. The image 200 comprises two solid parts 200A and 200B, with each solid part 200A, 200B being a Boolean combination of two solid shapes. In particular, solid part 200A comprises a Boolean combination of the two solid shapes 201 and 202 (solid shapes 201 being shown separated in FIG. 2A–FIG. 2B, respectively, as a rectangular block and a cylinder). Solid part 200B comprises a Boolean combination of solid shape 203 (a rectangular block) and a solid shape 204 (a cylindrical hole).

Figure 2A:
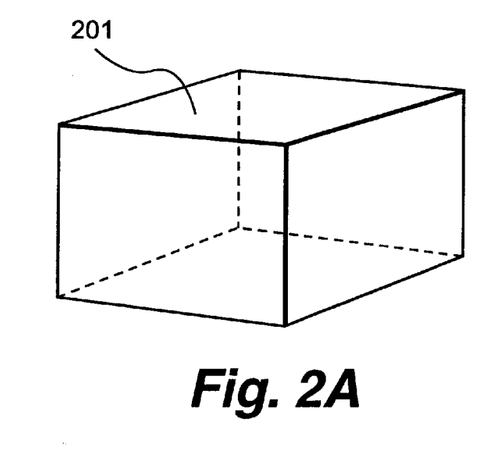
FIG. 2A and FIG. 2B are isometric views of primitive parts which comprise a first of the parts of FIG. 2.
Figure 2B:
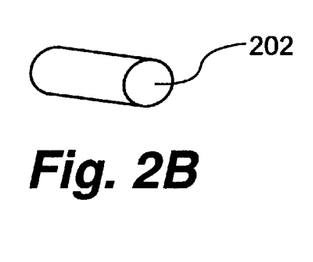

As understood from FIG. 2A–FIG. 2B together with FIG. 2, shape 201 is a rectangular block; shape 202 is a cylinder which is attached to a side face of shape 201. The part 200A is generated by first creating shape 201, then adding the shape 202 centrally on the side face of shape 201. Thus, the part 200A shown in FIG. 2 is itself a shape comprised of the shapes 201–202.

Figure 3A:
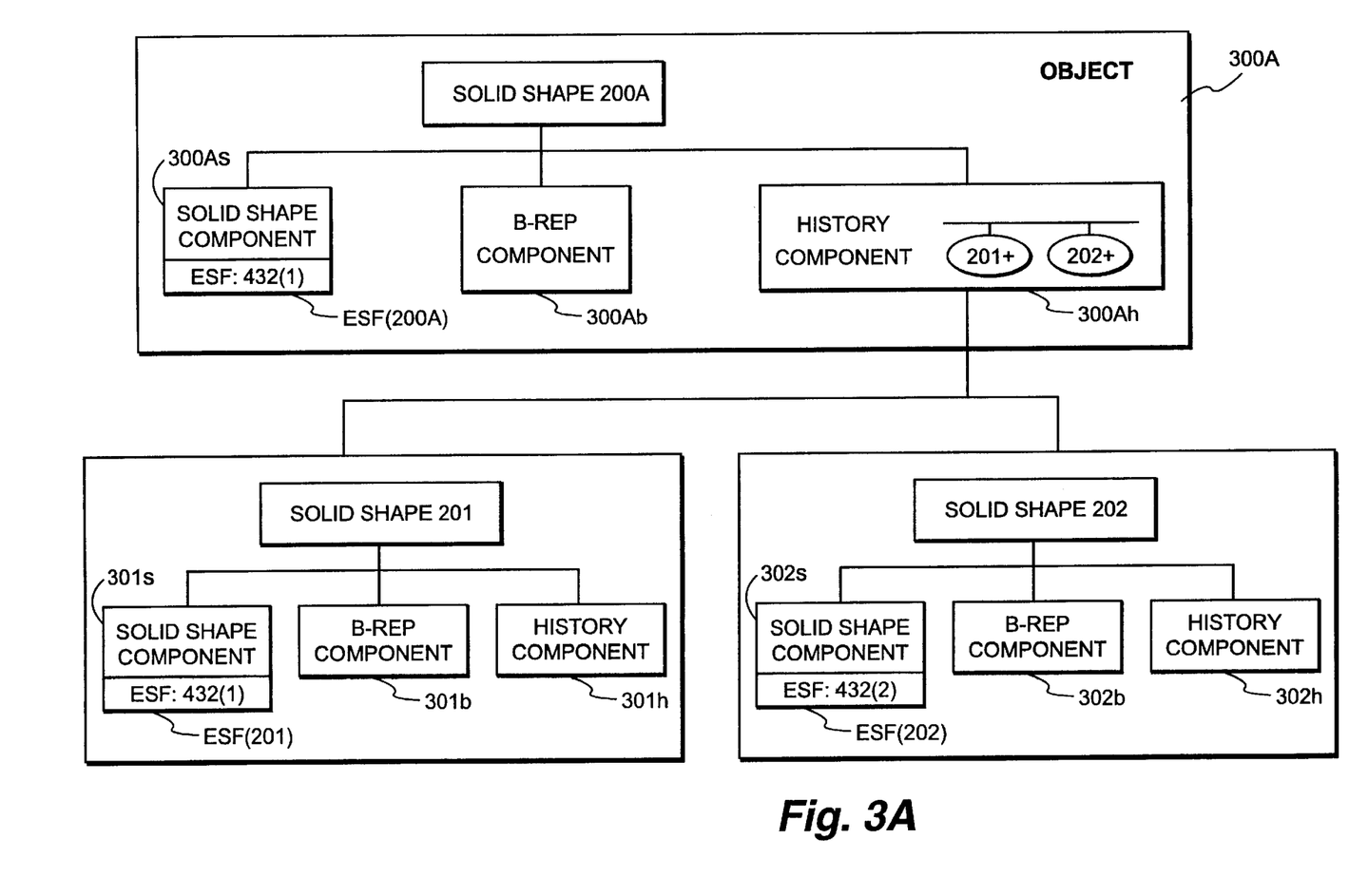
FIG. 3A is a diagrammatic view of a CSG tree for a first of the parts of FIG. 2.

Each of the shapes 200A, 201, and 202 shown in FIG. 2 has a corresponding executable object which is shown in the CSG tree of FIG. 3A. Similarly, each of the shapes 200B, 203, and 204 shown in FIG. 2 has a corresponding executable object which is shown in the CSG tree of FIG. 3B. In particular, shapes 200A, 201, and 202 have the respective executable objects 300A, 301, and 302 (see FIG. 3A), while shapes 200B, 203, and 204 have the respective executable objects 300B, 303, and 304 (see FIG. 3B). Since the shapes are represented using feature-based data structures, each of the executable objects 300A, 300B, and 301 through 304 include a shape component, a boundary representation (B-rep) component, and a history/creation component. For example, the feature-based executable object 300A for shape 200A has a shape component 300A*s*, a B-rep component 300A*b*, and a history/creation component 300A*h*. Each of the components can include executable instructions and a data structure.

A shape component performs various functions. For example, a shape component provides a data structure to store an abstract definition of the shape. Moreover, the shape component provides a handle or means for acquiring the B-rep component for the shape. As indicated above, a B-rep component includes a data structure describing the geometry and topology data for the shape; a history creation component includes a data structure reflecting how a shape has been created.

For the particular shape 200A shown in FIG. 2, the history/creation component 300A*h* is shown in FIG. 3A as including a data structure which depicts the creation information. In this regard, history/creation component 300A*h* shows (by a sequential reading from left to right) that shape 200A was created first by adding (depicted by the plus [+] sign) the shape 201, followed by adding the shape 202.

More detailed architecture of a shape, including buses coupled to constituent components of a shape, is discussed and illustrated in U.S. patent application Ser. No. 08/635,293, filed Apr. 19, 1996, entitled "Intelligent Shapes For Authoring Three-Dimensional Models", incorporated herein by reference.

Figure 4:
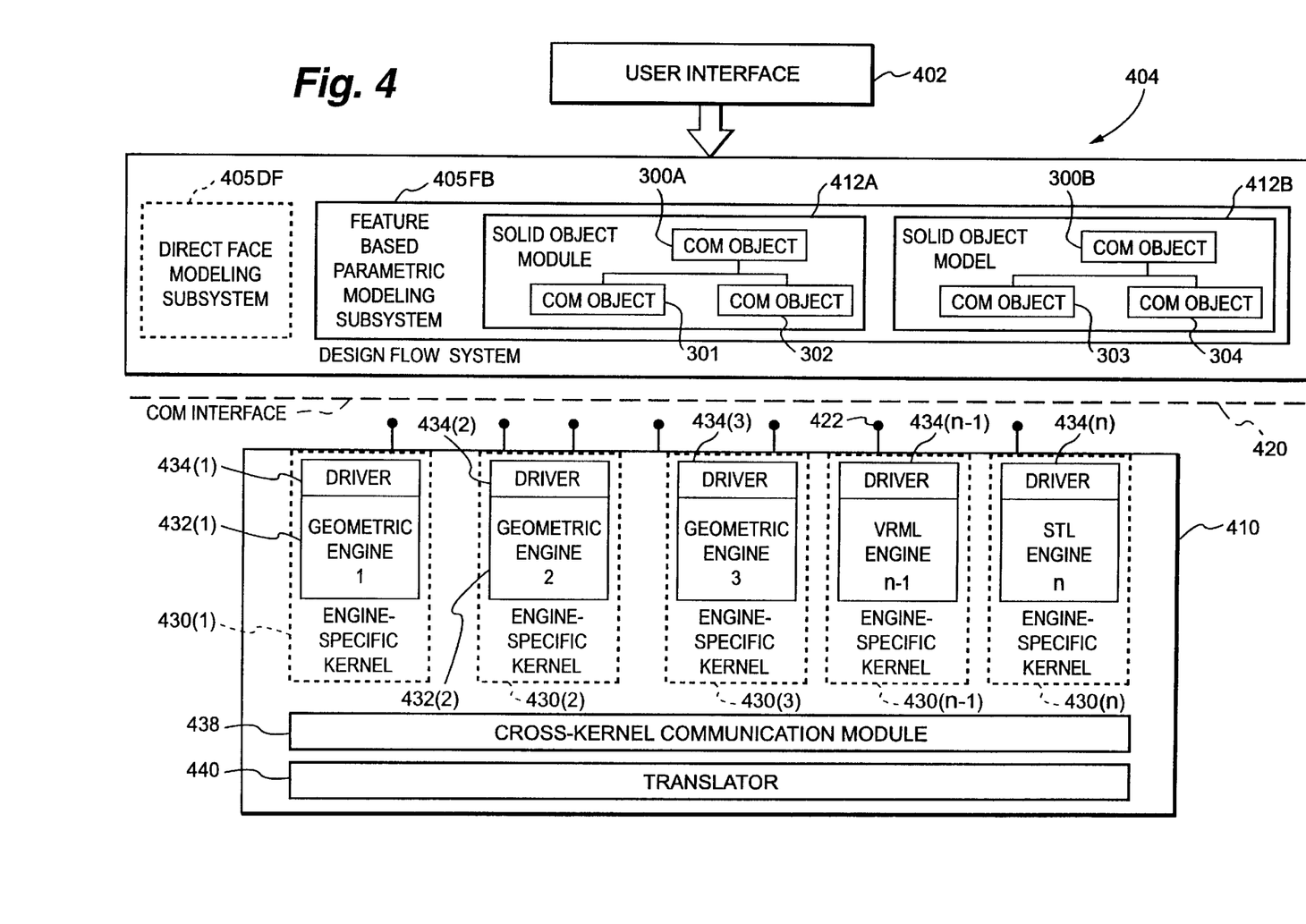
FIG. 4 is a diagrammatic view of basic aspects of a computer program executed by the example computer graphics workstation.

FIG. 4 illustrates basic aspects of a three dimensional geometric modeling computer program product 400 which is stored on disk 172 and executed by microprocessor 162. Program 400 includes user interface 402; design flow system 404; and modeling kernel 410.

In some embodiments, the design flow system 404 can include both a direct face modeling subsystem 405DF and a feature based parametric modeling subsystem 405FB. The coexistence of both a direct face modeling subsystem and a feature based parametric modeling subsystem is described in U.S. patent application Ser. No. 09/267,774, filed Mar. 15, 1999, entitled "THREE DIMENSIONAL GEOMETRIC MODELING SYSTEM", which is incorporated herein by reference. Since the present invention does not require the presence of both a direct face modeling subsystem and a feature based parametric modeling subsystem, the direct face modeling subsystem 405DF is shown framed by broken lines.

The feature based parametric modeling subsystem 405FB of the design flow system 404 includes a object module 412 which contains many executable objects (hereinafter referenced as "COM objects"). The representative object module 412A shown in FIG. 4 happens to include COM objects 300A, 301, and 302, respectively, for the shape 200A and its primitive shapes 201 and 202. Each COM object 300–302 is an executable object for its corresponding shape 200–202.

Similarly, object module 412B shown in FIG. 4 includes COM objects 300B, 303, and 304, respectively, for the shape 200B and its primitive shapes 203 and 204, with each COM object 300B, 301, and 302 being an executable object for its corresponding shape 200B, 203, 204.

The design flow system 404 with its COM objects communicates with modeling kernel 410 over COM (Component Object Model) Interfaces, represented by broken line 420 in FIG. 4. Details of component object modeling and the operation of COM Interface 420 is understood by those skilled in the art, particularly with reference to such publications as Rogerson, Dale, *Inside COM* (Microsoft Press, 1997), ISBN 1-57231-349-8. Therefore, the reader will appreciate that the symbols depicted by reference numerals 422 in FIG. 4 are interfaces, and that each interface comprises one or more function calls. Examples of such function calls pertinent to the present invention are described below.

The modeling kernel 410 comprises plural geometric engine-specific kernels 430(1)–430(N), shown framed by broken lines in FIG. 4. Each geometric engine-specific kernel 430 comprises both a geometric engine 432 and a driver 434 therefor. A geometric engine is a software module in the form of a library or dynamic linked libraries (DLLs), which provides data structure and general modeling functions to create, modify, query, and delete geometric and topologic data, e.g., B-representation entities.

The term "kernel" is thus employed in two contexts, i.e., in two levels of program structure. At the higher level, the term "modeling kernel" means a software component which provides all modeling functionality and geometric data structure for a three dimensional modeling system. This modeling kernel interacts with other components of the three dimensional modeling system through clearly defined interfaces. At a lower level, the modeling kernel is comprised of the plural geometric engine-specific kernels 430. The geometric engine-specific kernels 430 are individual software modules, each of which provides the same functionality through identical interfaces but invoking a different geometric engine and implementing its own methods to utilize the geometric engine and provide general as well as advanced modeling functionality.

The present invention is thus characterized by having plural concurrently executing geometric engines 432 in modeling kernel 410. For example, geometric engine 432(1) is of a type marketed by Spatial Technology Corporation as ACIS™. The geometric engine 432(2), on the other hand, is a geometric engine known as Parasolid™, marketed by Electronic Data Systems Corporation. The geometric engine 432(N–2) can be, for example, an in-house geometric engine developed by the author of program 400.

Whereas the examples of geometric engines 432(1)–432(*n*–2) provided above are geometric engines which perform complex operations (such as Boolean operations), it should be understood that other type of geometric engines can also be included in modeling kernel 410. For example, geometric engine 432(*n*–1) is an engine which can handle VRML (Virtual Reality Markup Language files. As another example, geometric engine 432(*n*) is an engine which handles stereolithography (STL) files. Although the VRML and STL engines cannot perform Boolean-type operations, they nevertheless can perform more limited operations (such as size scaling, for example).

Figure 8:
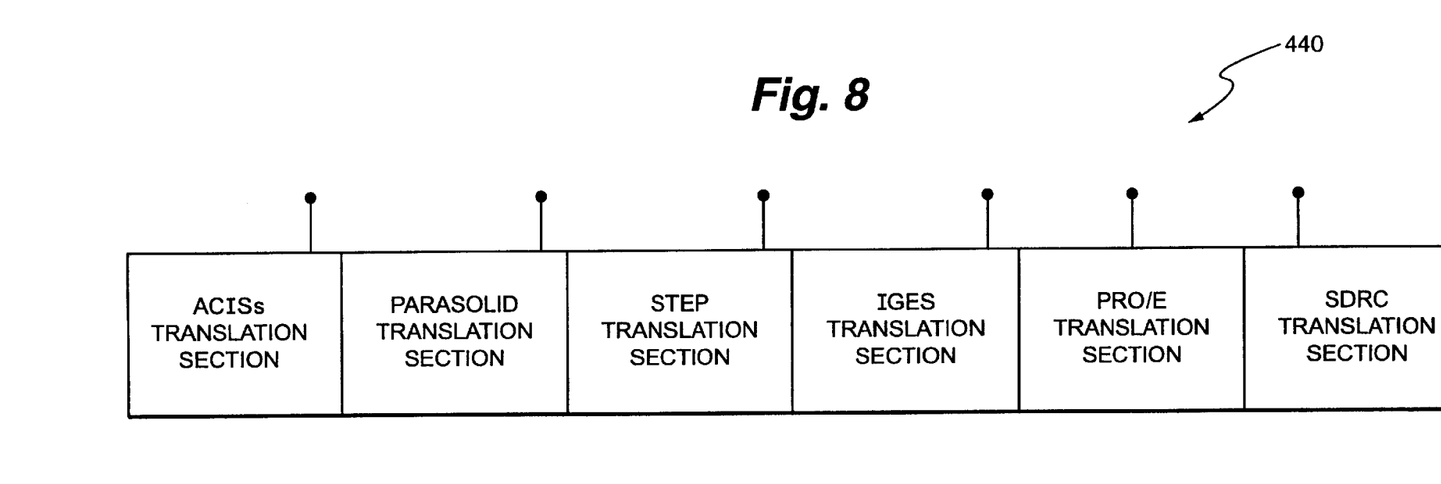
FIG. 8 is a schematic view of a translator included in a modeling kernel of the computer program product of FIG. 4.

In the modeling kernel 410, function calls with arguments can be passed between geometric engine-specific kernels 430 via cross-kernel communication module 438. In addition, cross-kernel communications module 438 can also make function calls to a translator 440, as hereinafter described. The translator 440, shown in more detail in FIG. 8, communicates across a design interface with the drivers 434 of modeling kernel 410, and preferably is a translator 434 that supports Integrated Data Exchange Specific (IDES) interfaces (defined by the author of program 400 to specify the interfaces needed for geometric data transformation). As such, the translator 440 has capability of translating from a first of various file types (specific to the corresponding geometric engine type) to a second of the file types. An example list of the file types from which/to which translator 440 can translate are depicted in FIG. 8 as ACISs files, Parasolid files, STEP files, IGES files, PRO/G files, and SDRC files. It should be understood that the translator 440 is not limited to these or other file types, or to any particular combination of file types for corresponding geometric engine types.

The functions of the drivers 434 relative to the present invention are illustrated hereinafter by example. Each driver 434 is specially coded by the author of program 400 in consideration of the particular geometric engine 432 with which it is paired. Each driver 434 supports the same COM Interfaces 422.

Advantageously, the modeling kernel 410 of the present invention provides concurrently executing multiple geometric engines. Thus, the modeling kernel 410 is a powerful evaluator which can invoke whichever geometric engine 432 is appropriate to do the work.

Figure 3B:
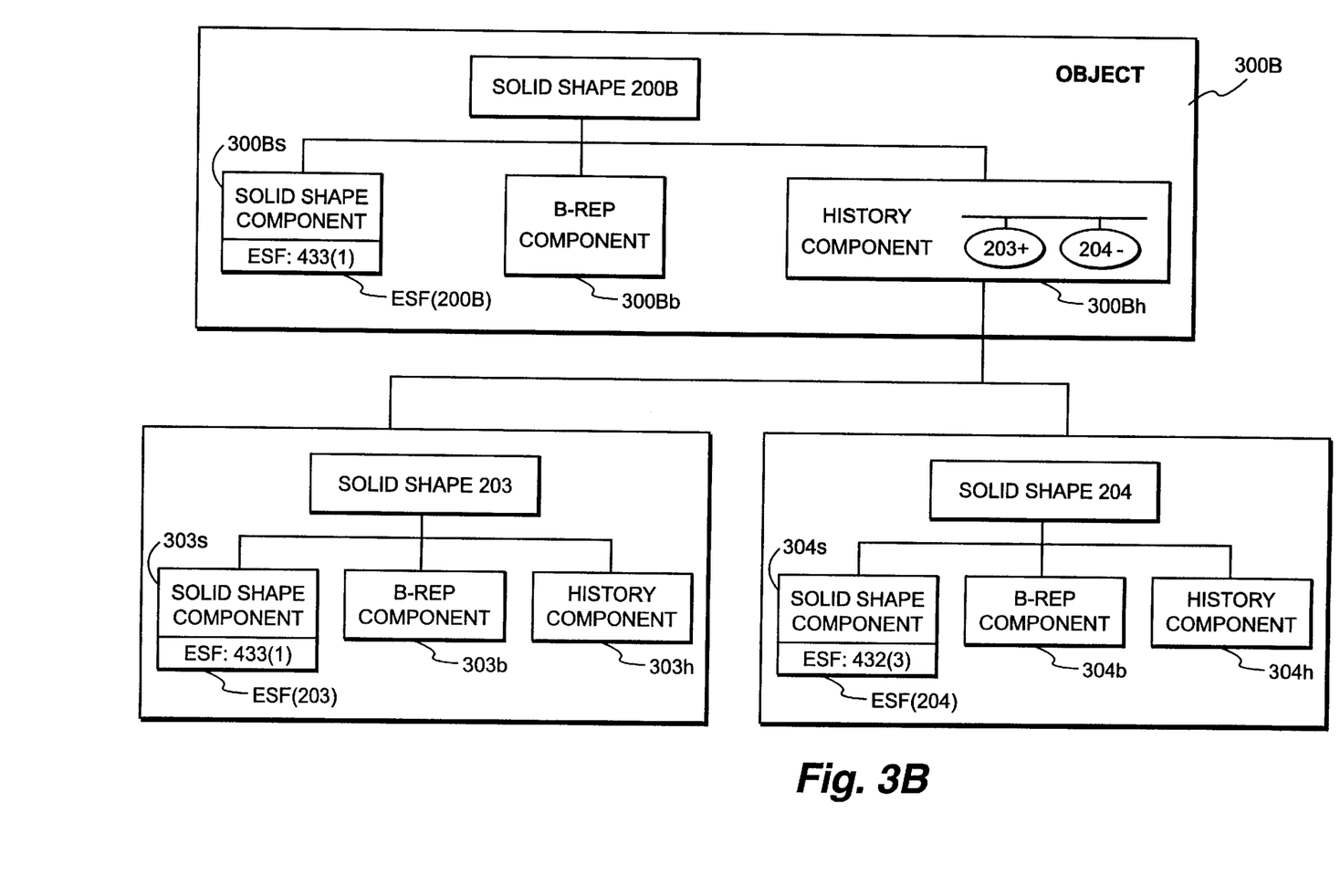
FIG. 3B is a diagrammatic view of a CSG tree for a second of the parts of FIG. 2.

In accordance with the present invention, each shape remembers what type of geometric engine 432 was used to generate its B-rep data. In this regard, in the shape component of each shape there is a engine signature field or ESF. For example, as illustrated in FIG. 3, the object 300A for shape 200A has an engine signature field ESF(200A); the object 301 for shape 201 has an engine signature field ESF(201); the object 302 for shape 202 has an engine signature field ESF(202). The engine signature fields ESF(200A) and ESF(201) indicate that both shapes 200A and 201 were generated by geometric engine 432(1). As seen from engine signature field ESF(202), on the other hand, shape 202 was generated by geometric engine 432(2). As seen in FIG. 3B, it so happens that all of the shapes 200B, 203, and 204 were generated by geometric engine 432(3), as evident from the respective engine signature fields ESF(200B), ESF(203), and ESF(204).

Advantageously, the fact that the present invention provides concurrently executing multiple geometric engines enables the user to work on (e.g., modify) both parts 200A and 200B in the same design or assembly, using the different geometric engines applicable to each. This is because all geometric engines in modeling kernel 410 remain concurrently active and available. When performing modeling operations, the differing geometric engines types associated with the differing shapes/parts are seamless to users of the three dimensional modeling system, and are conducted from the user's vantage point as if all shapes/parts are associated with the same geometric engine.

Figure 2C:
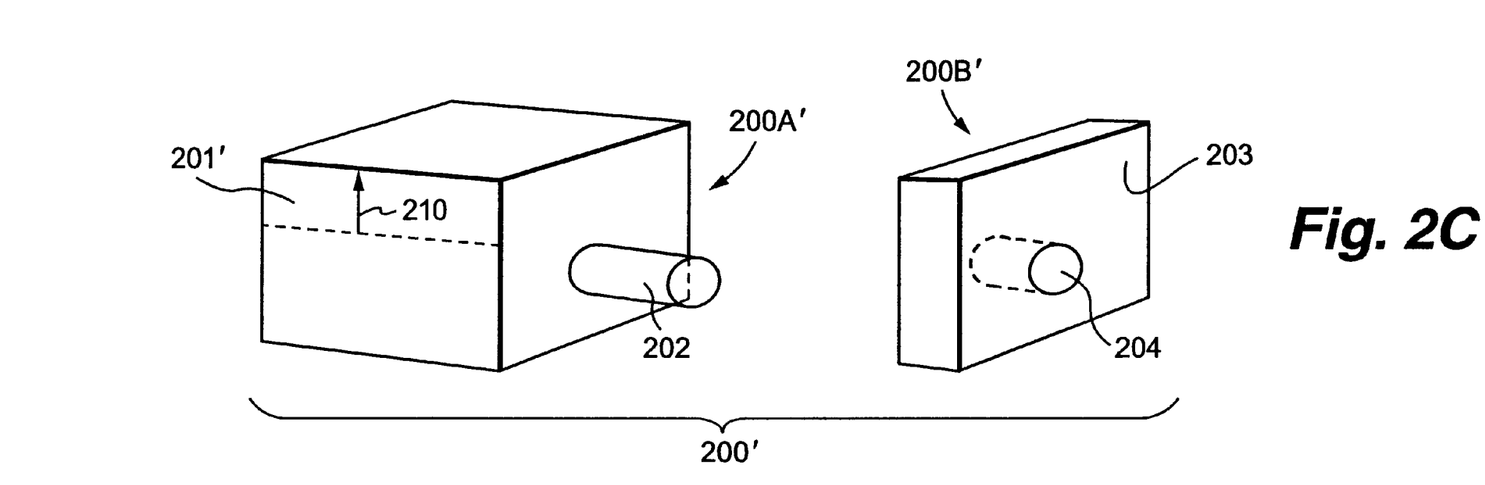
FIG. 2C and FIG. 2D are isometric views of showing editing of the two parts of FIG. 2.

For example, with respect to the two parts 200A, 200B shown in the image 200, the user can modify part 200B in the manner understood by comparing FIG. 2 with FIG. 2C. In particular, FIG. 2C shows that part 200B has been modified by narrowing the part 200B along the dimension parallel to the axis of the cylindrical hole 204, resulting in modified part 200B' shown in FIG. 2C. The modification resulting in part 200B' is performed by invoking geometric engine 423(3), since part 200B listed geometric engine 423(3) in its signature field ESF(200B) [as do constituent shapes 203 and 204 (see ESF(203) and ESF(204) in FIG. 3B)].

Then, immediately after modifying the part 200B to obtain the part 200B', the user modifies part 200A by increasing the height of the rectangular block of shape 201 in the manner shown by arrow 210 (compare FIG. 2 with FIG. 2C). In particular, in FIG. 2C the user has specified that the height of the rectangular block of shape 201 is to be of the same height as the rectangular block of shape 203. The height-extending operation is performed by the user invoking geometric engine 432(1), which is the appropriate geometric engine for part 200A and shape 201 (see the respect ESF fields in FIG. 3A). Thus, FIG. 2C shows a resultant modified part 200A' with its modified constituent shape 201', the modification having been made with reference to an aspect or dimension of shape which utilizes a different geometric engine (e.g., shape 203 using engine 423(3)).

Thus, it can be seen from the foregoing that the provision of multiple concurrent geometric engines allows the user to seamlessly manipulate one part using a first geometric engine, and then (in the same scene or assembly during the same execution time) manipulate another part using another geometric engine. None of the geometric engines in modeling kernel 410 need to be inactivated or substituted. Rather, all geometric engines are capable of operating concurrently (e.g., intermittently in accordance with user requirements) on the same scene or assembly.

Figure 2D:
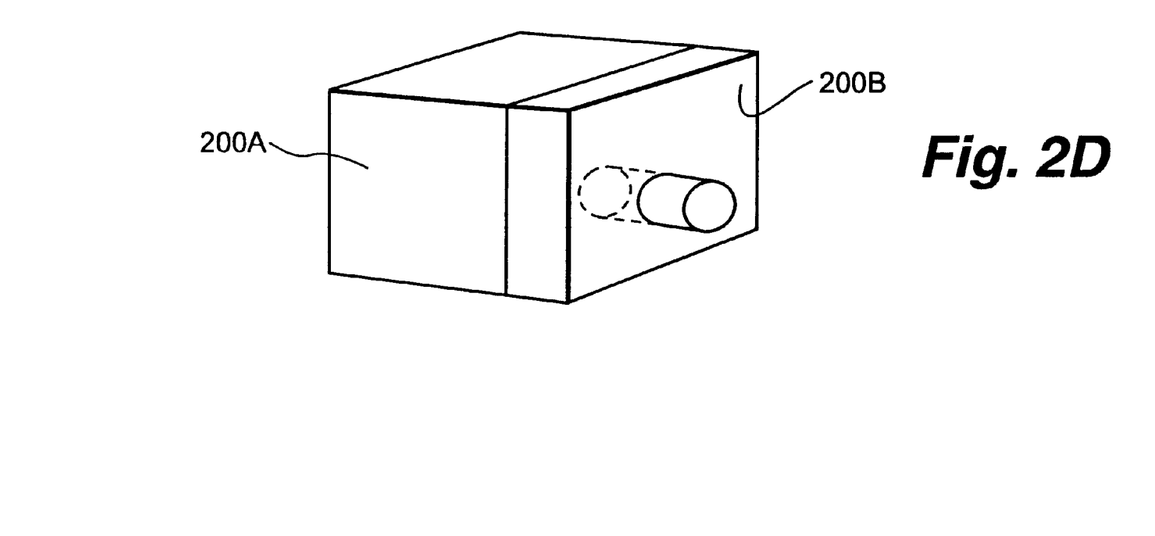

Moreover, the provision of multiple concurrent geometric engines also allows the user to combine parts in the manner depicted in FIG. 2D, although the parts have different geometric engines (e.g., part 200A has engine 432(1) and part 200B has engine 432(3)). Of course, the combination of parts 200A and 200B results in a new CSG tree. The combination of uniting of shapes/parts which utilize different geometric engines is understood from the ensuing discussion of how shapes 201 and 202 were combined to form part 200A.

Suppose, prior to formation of shape 200A, the shape 201 (the rectangle of FIG. 2A) and shape 202 (the solid cylinder of FIG. 2B) existed unconnected on the screen, and that the user (via user interface 402) gives a command to join shape 202 to shape 201 in the manner illustrated in FIG. 2. The execution of such a command, in the manner described below, illustrates the powerful capabilities of the modeling kernel 410 of the present invention with its concurrent multiple geometric engines 432.

In the above regard, one type of typical command from user interface 402 to design flow system 404 takes the example general format shown in Expression 1.

operation_type (shape1, shape2, specific_operation) [Expression 1]

For the particular example mentioned above wherein shape 202 of FIG. 2B is to be added to shape 201 of FIG. 2A, the command taken the more specific form shown in Expression 2.

Boolean (shape 201, shape 202, unite) [Expression 2]

Figure 5:
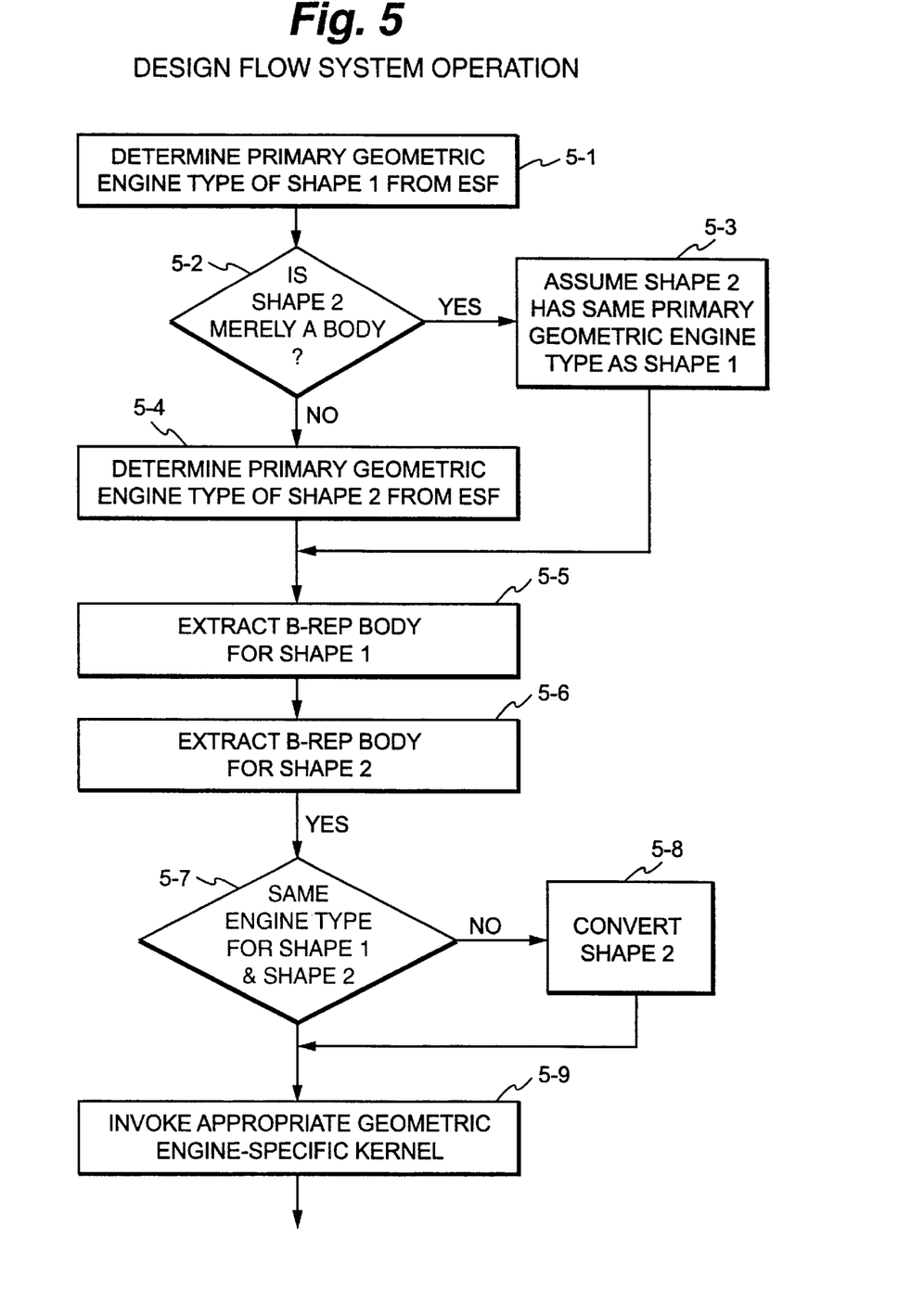
FIG. 5 is a flowchart showing basic steps performed by a design flow system of the computer program product of FIG. 4.

FIG. 5 shows basic steps performed by design flow system 404 upon receipt of a command such as that generically illustrated in Expression 1 and specifically illustrated in Expression 2. At step 5-1 the design flow system 404 determines the primary geometric engine type, i.e., the geometric engine type of the first shape passed as an argument in the command (e.g., shape 201 in the example of joining shape 202 to shape 201 in the illustration of FIG. 2, FIG. 2A, and FIG. 2B). To ascertain the primary geometric engine type, at step 5-1 the design flow system 404 checks the engine signature field ESF(201) of object 301 [see FIG. 3]. The engine signature field ESF(201) indicates that geometric engine 432(1) [e.g., the ASICS engine] is the engine for object 301.

At step 5-2, the design flow system 404 checks whether the second shape in the command argument is a shape, or a mere body. If the second shape of the command argument is a mere body, the design flow system 404 assumes (as indicated by step 5-3) that the second shape of the command argument has the primary geometric engine type, i.e., the same geometric engine (the primary geometric engine type) as the first shape of the command argument. But if the second shape of the command argument is a shape, at step 5-4 the design flow system 404 must determine the engine type of the second shape of the command argument. The determination of step 5-4 for the second shape of the command argument is accomplished in the same way as the determination of step 5-1 for the first shape of the command argument—checking the engine signature field (ESF). Thus, in the illustrated example, at step 5-4 the design flow system 404 checks field ESF(202) of the object 302 for the second shape 202, and thereupon discovers that the geometric engine type used by the second shape 202 is geometric engine 432(2) [e.g., a Parasolid geometric engine].

At step 5-5 and step 5-6, the design flow system 404 respectively extracts the B-rep body for the first shape of the command argument and the B-rep body for the second shape of the command argument. Then, at step 5-7, the design flow system 404 determines whether the geometric engine type for the first shape of the command argument is the same as the geometric engine type for the second shape of the command argument. The determination of step 5-7 is facilitated by the earlier ascertaining of the geometric engine types for each of the shapes of the command argument, as above explained with reference to step 5-1 and step 5-4.

If it is determined at step 5-7 that the shapes specified in the command argument have differing engine types, at step 5-8 a translation of the B-rep body of the second shape of the command argument is requested. Specifically, at step 5-8 the design flow system 404 requests and obtains a translation of the B-rep body of the second shape of the command argument to a form suitable by the geometric engine of the first shape of the command argument. In the present example, the shape 202 of FIG. 2B is being added or united to the shape 201 of FIG. 2A, the shape 202 utilizing the geometric engine 432(2) while the shape 201 utilizes geometric engine 432(1). Thus, at step 5-8 a request is made that the B-rep body of shape 202 be translated for use by geometric engine 432(1).

The translation request of step 5-8 takes the form of a function call across COM Interface 420 to the driver 434(2), i.e., the driver for the geometric engine for which the B-rep body of shape 202 is native (i.e., the driver associated with the engine which can execute the B-rep body of shape 202 as presently expressed). Upon receipt of the function call and determination (at step 6-1 of FIG. 6) that the function call is a translation request, at step 6-2 the driver 434(2) passes the function call request to translator 440. The translator 440 serves to perform the translation and provide the translation of the B-rep body to driver 434(2), whereupon (at step 6-3) the driver 434(2) returns the translated B-rep body to design flow system 404 as an argument of a function call.

When the B-rep bodies of both the first and second shapes of the command argument are in a form usable by the primary geometric engine type (i.e., the geometric engine type of the first shape of the command argument), at step 5-9 the design flow system 404 invokes the modeling kernel 410 to perform the requested operation of the command. In the example described above wherein shape 202 is to be united to shape 201, the function call takes the basic form of Expression 2, i.e., Boolean (shape 201, shape 202, unite). Of course, additional parameters are also passed in the function call, such as (for example) the location on shape 201 at which shape 202 is to be united to shape 201. The particular interface of COM Interface 420 across which the function call of step 5-9 is made depends upon the nature of the requested operation (e.g., there being an interface more appropriate, for example, to Boolean unite operations than for other operations). The arguments included in the function call provide modeling kernel 410 with the information necessary to determine which geometric engine-specific kernel 430 is to be invoked (e.g., geometric engine-specific kernel 430(1) with its geometric engine 432(1) in the illustrated example).

Figure 6:
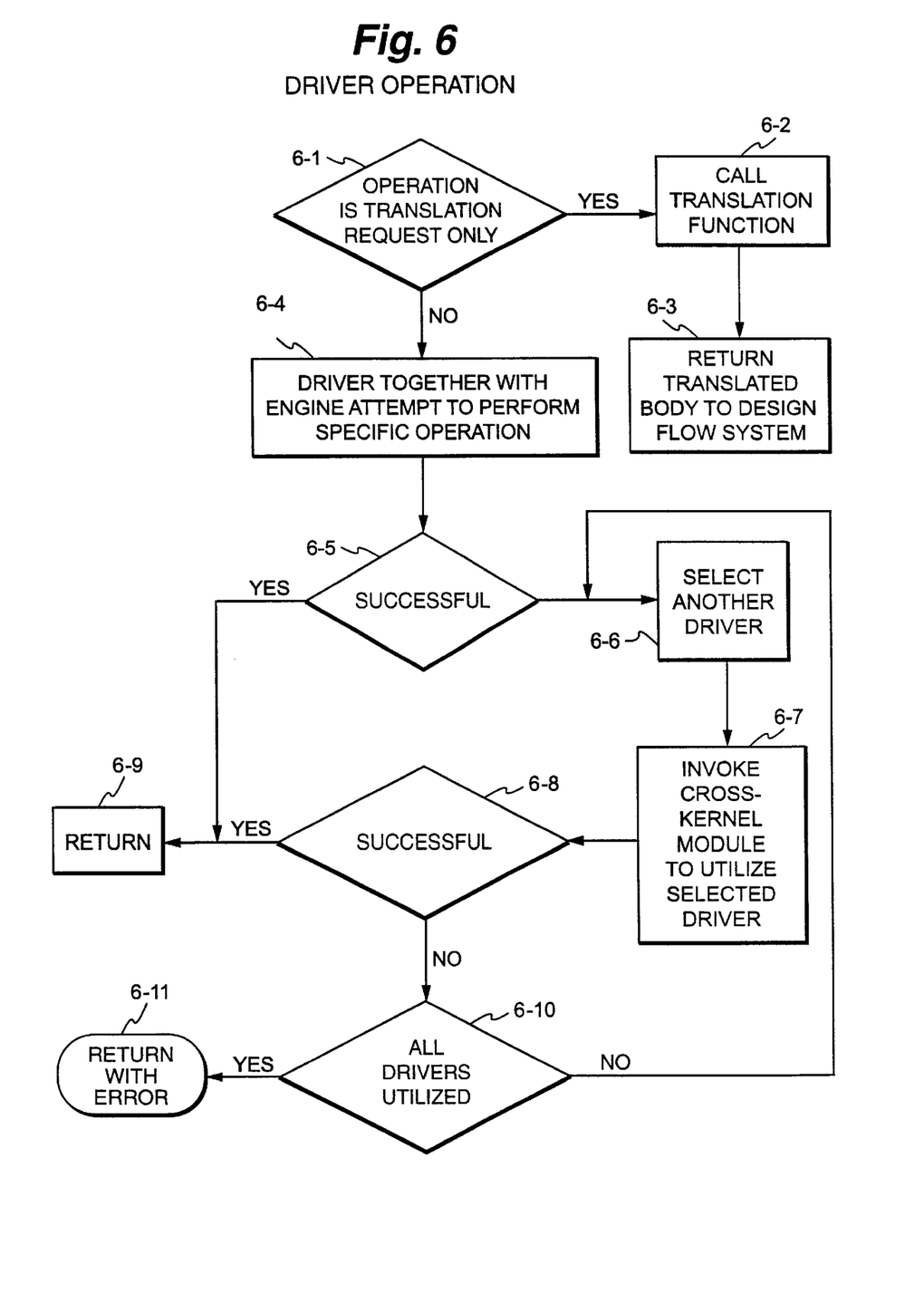
FIG. 6 is a flowchart showing basic steps performed by representative engine driver of the computer program product of FIG. 4.

FIG. 6 shows basic steps performed by a driver of geometric engine-specific kernel 430 upon receipt of a function call such as that of Expression 2. After the driver determines at step 6-1 that the operation is other than a mere translation, at step 6-4 the driver together with its associated geometric engine 432 attempt to perform the requested operation (e.g., a Boolean unite operation in the case of joining shape 202 to shape 201 in the illustration of FIG. 2). If the driver determines at step 6-5 that the requested operation is performed successfully, at step 6-9 the resultant united B-rep body is returned via a function call to design flow system 404 to deposit the body to the B-rep component 301b of shape 201.

Should it be determined at step 6-5 that the originally assigned geometric engine-specific kernel 430 did not successfully perform the requested operation, at step 6-6 the failing driver makes a choice of another driver for attempting to perform the requested operation. The logic of the choice at step 6-6 is based on numerous factors, such as (for example) the particular geometric engine type for the second shape of the command argument, the particular operation which is requested, and the relative strength of the engine types in consideration of the particular operation requested (e.g., unite operation, blend operation, healing operation). As is well known, some geometric engine types are better for some operations than are other geometric engine types.

After the choice of geometric engine type has been made at step 6-6, at step 6-7 the cross-kernel communication module 438 is invoked. The cross-kernel communication module 438 serves to transfer function calls (and the arguments [data] associated therewith) between geometric engine-specific kernels 430. For example, the cross-kernel communication module 438 is invoked by an unsuccessful, originally-designated driver 434 to transfer the unsuccessfully performed function call to another (auxiliary) driver 434. As in the case being described presently, after that another driver 434 has attempted to handle the operation (whether successfully or unsuccessfully), the results of the function call are returned to the originally-designated driver 434.

At step 6-8 a determination is made whether the auxiliary driver selected at step 6-6 successfully performed the requested operation. A flag indicative of the success/non-success status of the call is returned as an argument of the function call to the auxiliary driver. If the auxiliary driver did successfully perform the operation, the data reflecting the successful operation is returned at step 6-9. If the auxiliary driver did not successfully perform the operation, at step 6-10 the originally-designated driver determines whether there are yet other drivers which could be delegated to performed the requested operation. If other suitable drivers remain, the originally-designated driver repeats step 6-6, i.e., selects another driver, followed by repeating of steps 6-7 etc. as described above. If no other suitable drivers exist, at step 6-11 the originally-designated driver returns an error message as an argument of the function call.

As indicated above, when one driver 434 of modeling kernel 410 needs to communicate with another driver, the cross-kernel communication module 438 is employed. For example, if in the present illustrative example the geometric engine 432(1) were unable to perform successfully the unite operation requested by Expression 2, at step 6-6 the driver 434(1) may select driver 434(2) as a delegated driver for attempting to perform the requested operation. Such choice of driver 434(2) would be reasonable, in view of the fact that shape 202 initially had its B-rep body in a form suitable for the geometric engine 432(2) associated with driver 434(2).

Figure 7:
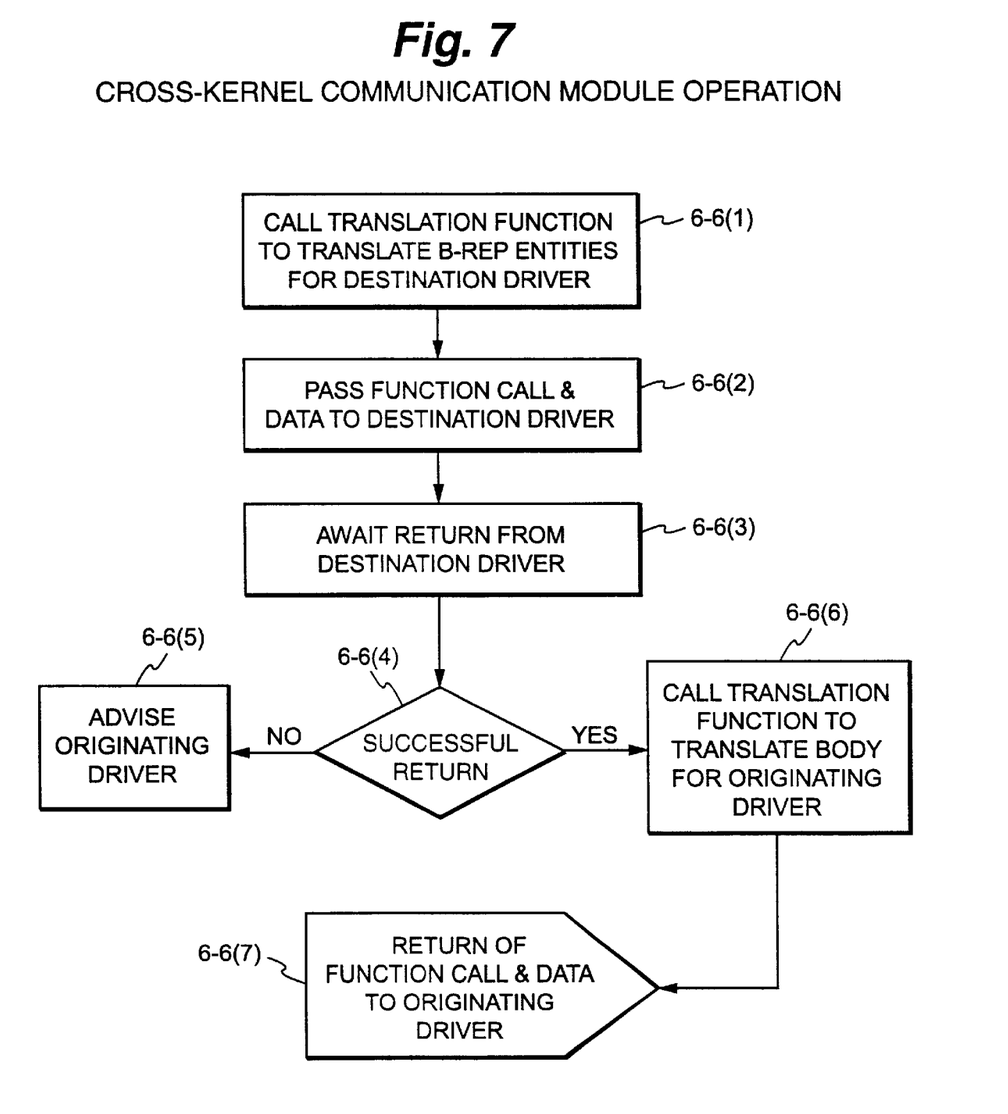
FIG. 7 is a flowchart showing basic steps performed by cross-kernel communication module included in a modeling kernel of the computer program product of FIG. 4

Basic steps performed by the cross-kernel communication module 438 are shown in FIG. 7. At step 6-6(1), the cross-kernel communication module 438 calls the translator 440 to translate the B-rep entities into a form suitable for the destination or delegated driver chosen at step 6-6. The call of translator 440 at step 6-6(1) is a function call by cross-kernel communication module 438 to translator 440. Upon receipt of the translation results from translator 440, at step 6-6(2) the cross-kernel communication module 438 passes the delegated function call and translated data file to the delegated or destination driver. Then, as reflected by step 6-6(3), cross-kernel communication module 438 awaits return of the function call from the delegated driver, as well as an indication of whether the delegated driver with its geometric engine 432 successfully performed the requested operation. If the requested operation is determined at step 6-6(4) not to have been successfully performed, at step 6-6(5) the cross-kernel communication module 438 so advises the initially-designated driver (upon which event the initially-designated driver performs actions understood in view of the preceding discussion of step 6-10 and ensuing steps). If the requested operation was successfully performed, at step 6-6(6) the cross-kernel communication module 438 requests a translation of the B-rep entities from the form utilized by the delegated driver to the form utilized by the originally-designated driver. As in the case of step 6-6(1), the call of translator 440 at step 6-6(6) is a function call by cross-kernel communication module 438 to translator 440. Upon receipt of the translation results from translator 440, at step 6-6(7) the cross-kernel communication module 438 passes the function call and translated data file to originally-designated driver. Action of the originally-designated driver upon the return of step 6-6(7) is understood in light of the foregoing discussion, e.g., of step 6-9 and step 6-10.

Thus, in the foregoing example it has been described how design flow system 404 requested geometric engine-specific kernel 430(1) to perform a Boolean unite operation for joining the shape 202 to shape 201, to obtain the shape 200A. It was seen that driver 434(1) was the initially-designated driver, but upon inability of driver 434(1) to successfully perform the operation, the operation was delegated to driver 434(2) of geometric engine-specific kernel 430(2). Upon successful completion of the requested operation, the results were transferred (via cross-kernel communication module 438) back to the initially-designated driver 434(1), which returned the results to design flow system 404.

The example of a Boolean type operation has been described above. It will be appreciated that other operation types can be included in a command from user interface 402, such as: blend, shell, scale, heal, as well as others.

Moreover, it should be understood that an operation requested by design flow system 404 does not necessarily have to involve plural shapes. Indeed, the requested operation may concern only one shape, such as forming a blend (e.g., rounding or curing an edge) of a cube shape. In such case, the command issued by design flow system 404 to modeling kernel 410 can take the form of Expression 3:

Blend (shape x, blend) [Expression 3]

If shape x had its B-rep body file in a form suitable for geometric engine 432(1) [e.g., the ACICS geometric engine], the design flow system 404 would likely invoke geometric engine-specific kernel 430(1) and particularly an interface to driver 434(1). But it may turn out that the geometric engine 432(1) is not optimally suited to perform a blend operation, in which case a delegation of the blend operation to another geometric engine-specific kernel 430, such as geometric engine-specific kernel 430(2), may occur in a manner similar to that described above.

The program 400 and system of the present invention with its modeling kernel 410 having multiple concurrent geometric engines 432 have numerous advantages. For example, the present invention enables the user to work, in the same scene or assembly, upon parts generated by different geometric engines. In this regard, the program and system of the present invention are beneficial for users such as a manufacturer who obtains parts from numerous suppliers, which each supplier having a part rendered by differing geometric engine types. With the present invention, the manufacturer can insert the different parts into the same assembly, although the parts are generated using differing geometric engines, and manipulate the parts (using their respective geometric engines) and even combine the parts, with no worry regarding integration of the parts obtained from the differing geometric engine types of the various vendors.

The three dimensional modeling system and program of the present invention also include logic for facilitating selection, upon a first instance, an optimum geometric engine type for performing an operation involving one or more shapes. For example, program 400 provides a way to allow users to make a dynamic and intelligent selection as to which of plural available geometric engines should be implemented for a given operation. If the selected geometric engine type happens to fail, the program and system perform an internal translation and on-the-fly invoke another geometric engine type.

The program and system of the present invention also provide a user with peace of mind regarding the user's choice of primary geometric engine type. In this regard, if a user were to selected geometric engine 432(1) as the primary geometric engine type for the user's design, the user need not be concerned whether such choice should become outmoded or less favored by others with whom the user must interface. With the program and system of the present invention, utilization of a differing geometric engine type (either existing or added in retrofit manner to modeling kernel 410) can be dynamically and intelligently determined. Therefore, a user's initial investment in his first choice of geometric engine type is not undermined.

Although the invention has been described above primarily with reference to solid shapes and solid parts, the invention is not limited to solid geometry. Rather, the person skilled in the art will understand that the principles of the invention are also applicable to surface shapes and surface parts.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer program product which provides a visual depiction of a three dimensional object upon a display device, the three dimensional object comprising plural shapes, the program comprising computer readable code stored in a memory, the computer readable code being executable on a processor to which information is input via a user input device; upon execution the program establishing:
   a design flow system comprising an object for each of one or more shapes;
   a modeling kernel comprising multiple concurrently available geometric engine types for performing an operation with respect to the one or more shapes.

2. The computer program product of claim 1, wherein the program enables performance of operations upon differing shapes in a same assembly, the differing shapes being generated by differing geometric engine types.

3. The computer program product of claim 1, wherein the program determines which of the multiple geometric engine types should attempt to perform the operation.

4. The computer program product of claim 1, wherein the modeling kernel comprises a first geometric engine type and a second geometric engine type, and wherein the modeling kernel invokes the second geometric engine type if the first geometric engine type is unable to perform the operation successfully.

5. The computer program product of claim 1, wherein the design flow system, when necessary, obtains a translation of a file of a B-rep body for a shape involved in the operation for making the file of the B-rep body compatible with the geometric engine type determined for the operation.

6. The computer program product of claim 1, wherein the modeling kernel comprises multiple geometric engine-specific kernels, and wherein each geometric engine-specific kernel comprises one of the geometric engine types and an associated driver.

7. The computer program product of claim 6, wherein the modeling kernel comprises a cross-kernel communication module through which plural drivers of the kernel communicate for the purpose of transferring performance of the operation.

8. The computer program product of claim 7, wherein the modeling kernel comprises a translator which is invoked by the cross-kernel communication module in conjunction with the transfer of an operation request between geometric engine-specific kernels.

9. The computer program product of claim 6, wherein the modeling kernel comprises a translator which is invoked in conjunction with the transfer of an operation request between geometric engine-specific kernels.

10. A three dimensional geometric modeling system comprising:
    a processor which executes a program comprising set of coded instructions stored in a memory;
    a display device upon which, when executed, the program provides a visual depiction of a three dimensional object, the three dimensional object comprising plural shapes,
    a user input device for inputting information to the processor;
    wherein, in depicting the three dimensional object, the program establishes:
       a design flow system comprising an object for each of one or more shapes;
       a modeling kernel comprising multiple concurrently available geometric engine types for performing an operation with respect to the one or more shapes.

11. The system of claim 10, wherein the program enables performance of operations upon differing shapes in a same assembly, the differing shapes being generated by differing geometric engine types.

12. The system of claim 10, wherein the program determines which of the multiple geometric engine types should attempt to perform the operation.

13. The system of claim 10, wherein the modeling kernel comprises a first geometric engine type and a second geometric engine type, and wherein the modeling kernel invokes the second geometric engine type if the first geometric engine type is unable to perform the operation successfully.

14. The system of claim 10, wherein the design flow system, when necessary, obtains a translation of a file of a B-rep body for a shape involved in the operation for making the file of the B-rep body compatible with the geometric engine type determined for the operation.

15. The system of claim 10, wherein the modeling kernel comprises multiple geometric engine-specific kernels, and wherein each geometric engine-specific kernel comprises one of the geometric engine types and an associated driver.

16. The system of claim 15, wherein the modeling kernel comprises a cross-kernel communication module through which plural drivers of the kernel communicate for the purpose of transferring performance of the operation.

17. The system of claim 16, wherein the modeling kernel comprises a translator which is invoked by the cross-kernel communication module in conjunction with the transfer of an operation request between geometric engine-specific kernels.

18. The system of claim 15, wherein the modeling kernel comprises a translator which is invoked in conjunction with the transfer of an operation request between geometric engine-specific kernels.

19. A method of providing a visual depiction of a three dimensional object upon a display device, the three dimensional object comprising plural shapes, the program comprising computer readable code stored in a memory, the computer readable code being executable on a processor to which information is input via a user input device; upon execution the program establishing:
    establishing an object in a design flow system to include one or more shapes;
    determining which of multiple concurrently available geometric engine types in a modeling kernel is to at least initially perform an operation with respect to the one or more shapes.

20. The method of claim 19, wherein further comprising the modeling kernel invoking a second geometric engine type if the a geometric engine type i s unable to perform the operation successfully.

21. The method of claim 19, further comprising the design f low system, when necessary, obtaining a translation of a file of a B-rep body for a shape involved in the operation for making the file of the B-rep body compatible with the geometric engine type determined for the operation.

22. The method of claim 19, further establishing multiple geometric engine-specific kernels, each of the multiple geometric engine-specific kernels comprising one of the geometric engine types and an associated driver.

23. The method of claim 19, further comprising including, in the modeling kernel, a cross-kernel communication module through which plural drivers of the kernel communicate for the purpose of transferring performance of the operation.

24. The method of claim 23, further comprising the cross-kernel communication module invoking a translator in conjunction with the transfer of an operation request between geometric engine-specific kernels.

25. The method of claim 19, further comprising invoking a translator in conjunction wit h the transfer of an operation request between geometric engine-specific kernels.

26. A method of providing a visual depiction of a three dimensional object upon a display device, the three dimensional object comprising plural shapes, the pro gram comprising computer readable code stored in a memory, the computer readable code being executable on a processor to which information is input via a user input device; upon execution the program establishing:

establishing plural shapes in an assembly, the plural shapes being generated by differing geometric engines;

operating upon one or more of the plural shapes in the assembly by invoking the geometric engine(s) which generated the one or more plural shapes operated upon.

\* \* \* \* \*